US012794625B2

(12) United States Patent
Kakishima et al.

(10) Patent No.: US 12,794,625 B2
(45) **Date of Patent: *Nov. 10, 2026**

(54) USER EQUIPMENT AND METHOD OF CONTROL OF CHANNEL STATE INFORMATION (CSI) REPORTING

(71) Applicant: NTT DOCOMO, INC., Tokyo (JP)

(72) Inventors: Yuichi Kakishima, Tokyo (JP); Chongning Na, Tokyo (JP); Satoshi Nagata, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/483,343

(22) PCT Filed: Jan. 31, 2018

(86) PCT No.: PCT/US2018/016087

§ 371 (c)(1),
(2) Date: Aug. 2, 2019

(87) PCT Pub. No.: WO2018/144508

PCT Pub. Date: Aug. 9, 2018

(65) Prior Publication Data

US 2019/0379494 A1 Dec. 12, 2019

Related U.S. Application Data

(60) Provisional application No. 62/454,528, filed on Feb. 3, 2017.

(51) Int. Cl.
*H04L 5/00* (2006.01)

(52) U.S. Cl.
CPC ............ *H04L 5/005* (2013.01); *H04L 5/0057* (2013.01); *H04L 5/00096* (2013.01)

(58) Field of Classification Search
CPC ..... H04L 5/005; H04L 5/0057; H04L 5/0096; H04L 5/0053
See application file for complete search history.

(56) References Cited

U.S. PATENT DOCUMENTS

| | | | | |
|---|---|---|---|---|
| 11,206,177 B2 * | 12/2021 | Noh | ...................... | H04L 5/0023 |
| 2011/0194551 A1 * | 8/2011 | Lee | ...................... | H04L 5/0048 375/267 |

(Continued)

FOREIGN PATENT DOCUMENTS

CN 102624494 A 8/2012

OTHER PUBLICATIONS

CATT; "Remaining Issues on aperiodic CSI-RS for FD-MIMO", 3GPP Draft; R-1608733; TSG-RAN WG1 Meeting *86bis; Lisbon, Portugal; Oct. 10-14, 2016 (3 page) (Year: 2016).*

(Continued)

*Primary Examiner* — Thinh D Tran
(74) *Attorney, Agent, or Firm* — Osha Bergman Watanabe & Burton LLP

(57) ABSTRACT

A user equipment (UE) includes a memory that stores a state of semi-persistent Channel State Information (CSI)-Reference Signal (RS) as a first state where the semi-persistent CSI-RS is activated or a second state where the semi-persistent CSI-RS is deactivated; a receiver that receives a predetermined trigger information; and a processor that changes the state in the memory and causes a transmitter to perform aperiodic CSI reporting based on the predetermined trigger information.

6 Claims, 16 Drawing Sheets

(56) References Cited

U.S. PATENT DOCUMENTS

| | | | | |
|---|---|---|---|---|
| 2014/0086285 A1* | 3/2014 | Yang | H04B 7/0417 375/219 |
| 2015/0117350 A1* | 4/2015 | Seo | H04B 7/0417 370/329 |
| 2016/0337018 A1* | 11/2016 | Hwang | H04L 5/003 |
| 2017/0195031 A1* | 7/2017 | Onggosanusi | H04B 7/0626 |
| 2018/0049149 A1* | 2/2018 | Lee | H04W 64/00 |
| 2018/0091992 A1* | 3/2018 | Frenne | H04B 7/0626 |
| 2018/0219664 A1* | 8/2018 | Guo | H04B 17/318 |
| 2019/0090218 A1* | 3/2019 | Noh | H04W 72/23 |
| 2019/0098523 A1* | 3/2019 | Muruganathan | H04L 5/0048 |
| 2019/0116009 A1* | 4/2019 | Yum | H04B 7/0408 |
| 2020/0014446 A1* | 1/2020 | Tomeba | H04W 24/10 |
| 2020/0021413 A1* | 1/2020 | Park | H04B 7/0469 |
| 2021/0084640 A1* | 3/2021 | Kang | H04L 5/0048 |

OTHER PUBLICATIONS

Muruganathan et al., “Systems and Methods for Reliable Dynamic Indication for Semi-Persistent CSI-RS”, provision U.S. Appl. No. 62/444,241, filed Jan. 9, 2017 (Year: 2017).*

Kang et al., “Method for transmitting plurality of beam of uplink control channel/Network controlled multi-beam based PUCCH transmission”, U.S. Appl. No. 62/454,000, filed Feb. 2, 2017 (Year: 2017).*

Park et al., “CSI-RS design for new RAT”, U.S. Appl. No. 62/453,005, filed Feb. 1, 2017 (Year: 2017).*

Guo et al., “Method and apparatus for CRI report in next generation wireless systems”, U.S. Appl. No. 62/453,284 filed Feb. 1, 2017 (Year: 2017).*

NTT Docomo; “CSI Acquisition Schemes for NR”, 3GPP Draft; R-1700596; 3GPP TSG RAN WG1 NR Ad-Hoc Meeting; Spokane, USA; Jan. 16-20, 2017 (5 page).

CATT; “Remaining Issues on aperiodic CSI-RS for FD-MIMO”, 3GPP Draft; R-1608733; TSG-RAN WG1 Meeting #86bis; Lisbon, Portugal; Oct. 10-14, 2016 (3 page).

International Search Report for corresponding International Application No. PCT/US2018/016087, mailed Apr. 26, 2018 (4 pages).

Written Opinion for corresponding International Application No. PCT/US2018/016087, mailed Apr. 26, 2018 (6 pages).

ETSI TS 136.211 V13.4.0; “Lte; Evolved Universal Terrestrial Radio Access (E-UTRA); Physical channels and modulation (3GPP TS 36.211 version 13.4.0 Release 13);” Feb. 2017 (172 pages).

ETSI TS 136.213 V13.4.0; “LTE; Evolved Universal Terrestrial Radio Access (E-UTRA); Physical layer procedures (3GPP TS 36.213 version 13.4.0 Release 13);” Mar. 2017 (389 pages).

Office Action issued in the counterpart Chinese Patent Application No. 201880015701.9, mailed on Jul. 2, 2021 (16 pages).

Office Action issued in the counterpart Chinese Patent Application No. 201880015701.9, mailed on Feb. 7, 2022 (13 pages).

MCC Support; “Draft Report of 3GPP TSG RAN WG1 #87 v0.1.0 (Reno, USA, Nov. 14-18, 2016)”; 3GPP TSG RAN WG1 Meeting #88, R1-17xxxxx; Athens, Greece; Feb. 13-17, 2017 (243 pages).

* cited by examiner

FIG. 3

Information Element in Resource Setting

| Information | Information Element |
|---|---|
| Resource Number | Resource Number (Index) |
| Time-Domain Information | Information indicating Transmission Type of Periodic/Aperiodic/Semi-persistent transmission |
| | Transmission Period and Timing Offset Value |
| | Number of RS Transmission (in case of Semi-persistent transmission) |
| Frequency-Domain Information | Information indicating Band type of Wideband/Partial Band/Subband |
| | Frequency Hopping Information |
| | Frequency Reuse Information |
| Multiplexing Position in Resource Block | Multiplexing Position in Time/Frequency-Domain in Resource Block |
| Information of Number of Antenna Ports | Number of Antenna Ports of RS |
| Code Division Multiplexing (CDM) Information | Information of Code Division Multiplexing (CDM) applied to RS |
| Measurement Restriction Information | Measurement Restriction Information (in case of Periodic and Semi-persistent transmission) |

FIG. 4

RRC structure of CSI-RS resource configuration:
IE 1 (level-1): CSI-RS-Setting:
{a list of CSI-RS-CDM-Resource-Config
}
IE 2 (level-2): CSI-RS-CDM-Resource-Config
{a list of CSI-RS-RE-Config.
}
IE 3 (level-3): CSI-RS-RE-Config.
{resource configuration, e.g., RE locations
Port number, e.g., 2, 4, [8]}

Port Aggregation

FIG. 7

OCC Code Design

In CSI-RS-RE-Config.

- $P^{RE}$: total port number, e.g., 2
- $p^{RE}$: port index, e.g., {0, 1}
- $OCC_{p^{RE}}$: OCC of port $p^{RE}$

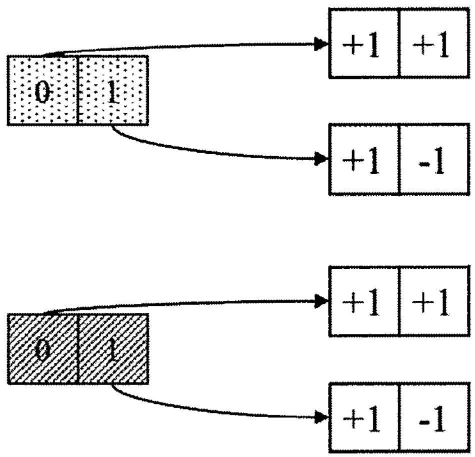

In CSI-RS-CDM-Resource-Config.

- $P^{CDM}$: total port number, e.g., 4
- $p^{CDM}$: port index, e.g., {0, 1, 2, 3}
- $K^{RE}$: CSI-RS-RE-Config. Number, e.g., 2
- $k^{RE}$: CSI-RS-RE-Config. Index, e.g., {0, 1}
- $OCC_{p^{CDM}}$: OCC of port $p^{CDM}$
- $OCC_{k^{RE}}$: OCC between different RE config. groups:

$$p^{CDM} = p^{RE} + k^{RE} P^{RE}$$
$$OCC_{p^{CDM}} = OCC_{k^{RE}} \otimes OCC_{p^{CDM}}$$

$$OCC_{k^{RE}=0} = [+1, +1]$$
$$OCC_{k^{RE}=1} = [-1, +1]$$

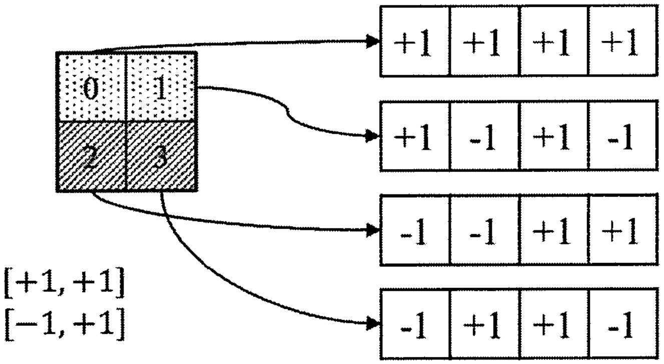

FIG. 8

Information Element in Interference Measurement (IM) Setting

| Information | Information Element |
|---|---|
| IMR Number | IMR Number (Index) |
| Time-Domain Information | Information indicating Type of Periodic/Aperiodic/Semi-persistent |
| | IM Period and Timing Offset Value |
| | Multiplexing Number of Interference Measurement Resource (IMR) (in case of Semi-persistent IM) |
| Frequency-Domain Information | Information indicating Band type of Wideband/Partial Band/Subband |
| | Frequency Hopping Information |
| | Frequency Reuse Information |
| Multiplexing Position in Resource Block | Multiplexing Position in Time/Frequency-Domain in Resource Block |
| Measurement Restriction Information | Measurement Restriction Information (in case of Periodic and Semi-persistent transmission) |

FIG. 9

Information Element in CSI Reporting Setting

| Information | Information Element |
|---|---|
| CSI Reporting Setting Number | CSI Reporting Setting Number (Index) |
| Time-Domain Information | Information indicating CSI Reporting Type of Periodic/Aperiodic/Semi-persistent CSI Reporting |
| | CSI Reporting Period and Timing Offset Value |
| | Number of CSI Reporting (in case of Semi-persistent transmission) |
| Multiplexing Method of Reporting Information | Multiplexed Physical Channel Information (e.g., PUCCH and/or PUSCH) |
| Feedback Information | RI, CRI, PMI, CQI, and/or RSRP |
| Codebook Information | Information indicating Applied Codebook(s) |
| Switching Information to Switch between Type I and Type II CSI feedback | Switching Information to Switch between Type I and Type II CSI feedback |
| ON/OFF Information of CSI Reporting | Information indicating ON/OFF of CSI Reporting |

FIG. 10

Information Element in CSI Measurement Setting

| Information | Information Element |
|---|---|
| CSI Measurement Setting Number | CSI Measurement Setting Number (Index) |
| RS setting | RS for CSI measurement |
| IM setting | IM for CSI measurement |
| CSI reporting setting | CSI reporting setting |
| ON/OFF Functionality | ON/OFF Functionality |

"1" indicates that UE receives Trigger bit

"0" indicates that UE does not receive Trigger bit

"1" indicates that UE receives Trigger bit

"0" indicates that UE does not receive Trigger bit

Case when semi-persistent CSI-RS resource is reserved (periodicity and timing offset is configured)

Case when semi-persistent CSI-RS resource is not reserved, e.g., only periodicity is configured

USER EQUIPMENT AND METHOD OF CONTROL OF CHANNEL STATE INFORMATION (CSI) REPORTING

TECHNICAL FIELD

The present invention generally relates to a method of acquiring Channel State Information (CSI) in a wireless communication system including a base station and a user equipment.

BACKGROUND ART

In Third Generation Partnership Project (3GPP), Channel State Information (CSI) acquisition schemes for New Radio (NR; fifth generation (5G) radio access technology) are being studied to achieve efficient precoding with massive antenna array. For example, new technologies such as semi-persistent and aperiodic CSI-RS transmission and semi-persistent and aperiodic CSI reporting may be applied to the CSI acquisition schemes in NR.

The conventional CSI acquisition schemes under legacy Long Term Evolution (LTE) (e.g., Rel. 13 LTE) do not support the aforementioned new technologies in NR. Accordingly, the conventional CSI acquisition schemes are not available for the conventional CSI acquisition schemes for NR. Furthermore, CSI acquisition schemes for NR considering the aforementioned new technologies are not determined in the 3GPP standard.

CITATION LIST

Non-Patent Reference

[Non-Patent Reference 1] 3GPP, TS 36.211 V 13.4.0
[Non-Patent Reference 2] 3GPP, TS 36.213 V13.4.0

SUMMARY OF THE INVENTION

One or more embodiments of the present invention relate to a user equipment (UE) that includes a memory that stores a state of semi-persistent Channel State Information (CSI)-Reference Signal (RS) as a first state where the semi-persistent CSI-RS is activated or a second state where the semi-persistent CSI-RS is deactivated; a receiver that receives a predetermined trigger information; and a processor that changes the state in the memory and causes a transmitter to perform aperiodic CSI reporting based on the predetermined trigger information.

One or more embodiments of the present invention relate to a method of control of aperiodic Channel State Information (CSI) reporting that includes managing, with a user equipment (UE), a state of semi-persistent Channel State Information (CSI)-Reference Signal (RS) as a first state where the semi-persistent CSI-RS is activated or a second state where the semi-persistent CSI-RS is deactivated; receiving, with the UE, a predetermined trigger information from a base station; changing, with the UE, the managed state based on the predetermined trigger information; and performing, with the UE, aperiodic CSI reporting based on the predetermined trigger information.

Other embodiments and advantages of the present invention will be recognized from the description and figures.

BRIEF DESCRIPTION OF THE DRAWINGS

FIG. 3 is a diagram showing an example of information elements in a resource setting according to one or more embodiments of the first example of the present invention.

FIG. 4 is a diagram showing an example of a format of CSI-RS resource configurations according to one or more embodiments of the first example of the present invention.

FIG. 7 is a diagram to explain OCC code design in FIG. 5 according to one or more embodiments of the first example of the present invention.

FIG. 8 is a diagram showing an example of information elements in an IM setting according to one or more embodiments of the first example of the present invention.

FIG. 9 is a diagram showing an example of information elements in a CSI reporting setting according to one or more embodiments of the first example of the present invention.

FIG. 10 is a diagram showing an example of information elements in a CSI measurement setting according to one or more embodiments of the first example of the present invention.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
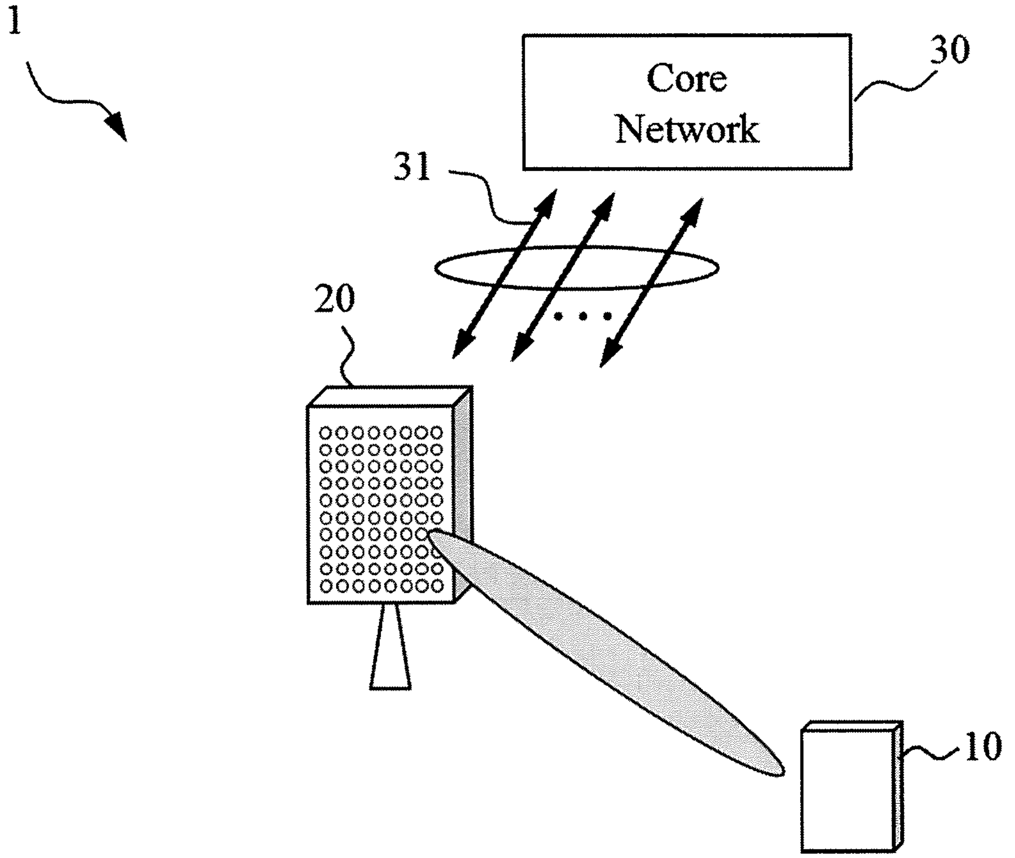
FIG. 1 is a diagram showing a configuration of a wireless communication system according to one or more embodiments of the present invention.

FIG. 1 is a wireless communications system 1 according to one or more embodiments of the present invention. The wireless communication system 1 includes a user equipment (UE) 10, a base stations (BS) 20, and a core network 30. The wireless communication system 1 may be a New Radio (NR) system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be Evolved NodeB (eNB).

The BS 20 includes antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

First Example

Figure 2:
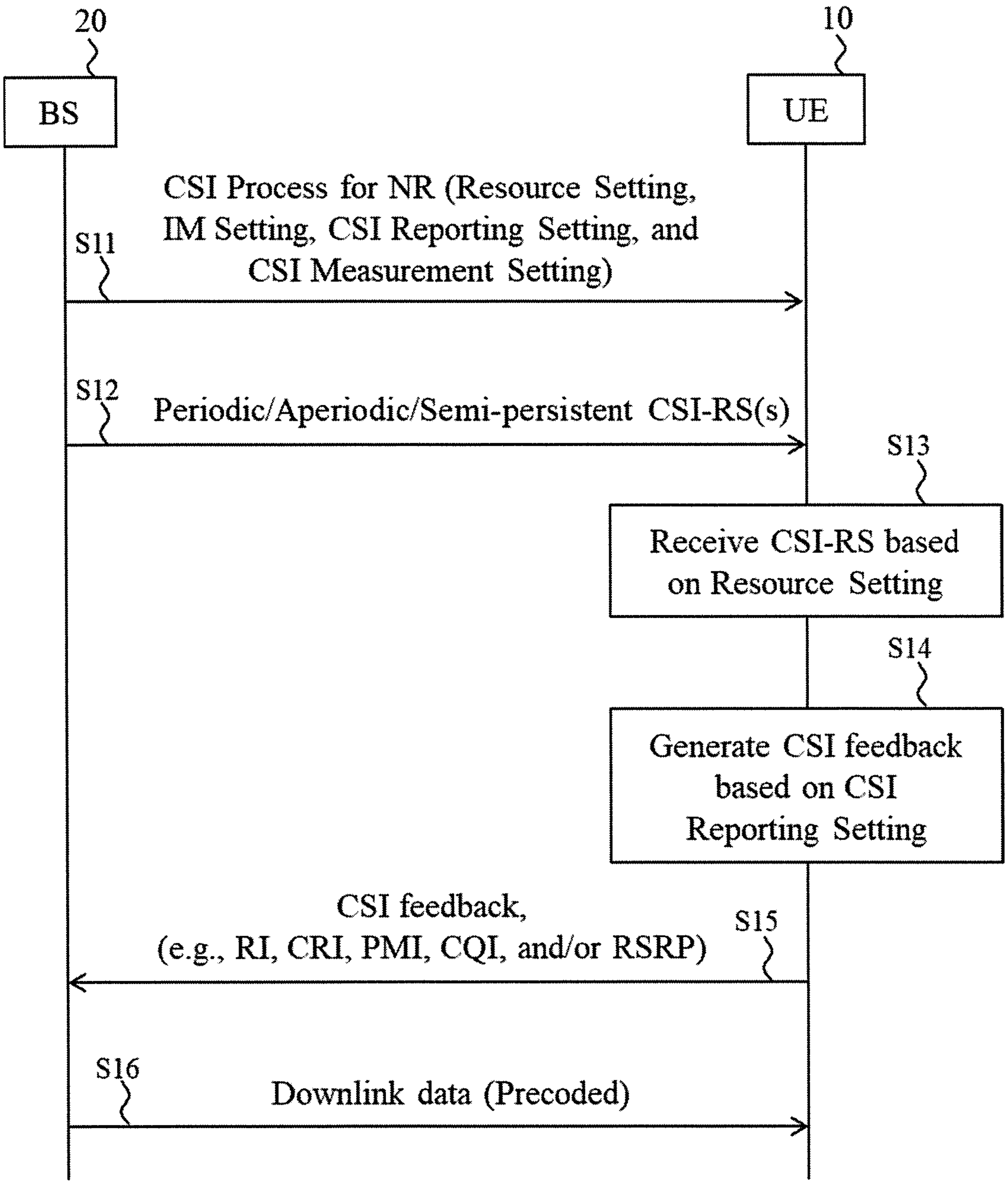
FIG. 2 is a sequence diagram showing an operation example of a CSI acquisition scheme according to one or more embodiments of a first example of the present invention.

FIG. 2 is a sequence diagram showing an example operation of a CSI acquisition scheme according to one or more embodiments of the first example of the present invention.

As shown in FIG. 2, at step S11, The BS 20 may transmit a CSI process for NR to the UE 20. In one or more embodiments of the present invention, the CSI process for NR is a newly designed CSI process different from a conventional CSI process under LTE Rel. 13. The CSI process for NR includes an resource setting, an IM setting, a CSI reporting setting, and a CSI measurement setting. For example, the resource setting includes information indicating the CSI-RS to be transmitted is the periodic CSI-RS, the aperiodic CSI-RS, or the semi-persistent CSI-RS. Information elements of the resource setting, the IM setting, the CSI reporting setting, and the CSI measurement setting will be described below in detailed, with reference to FIGS. 3-6. For example, resource setting and IM setting can be a single parameter as Resource setting. For example, CSI measurement setting can be called as Link.

At step S12, the BS 20 may transmit, to the UE 10, periodic, aperiodic, and/or semi-persistent CSI-RS(s) in accordance with the information element designated in the resource setting.

At step S13, the UE 10 may receive the periodic, aperiodic, and/or semi-persistent CSI-RS(s) based on the received resource setting. At step S14, the UE 10 generate CSI feedback based on the received CSI reporting setting. At step S15, the UE 10 may transmit, to the BS 20, the CSI feedback in accordance with the CSI reporting setting. For example, the CSI feedback includes at least one of Rank Indicator (RI), CSI-RS resource indicator (CRI), Precoding Matrix Indicator (PMI), Channel Quality Indicator (CQI), and Reference Signal Received Power (RSRP).

At step S16, the BS 20 may transmit downlink data precoded using the received CSI feedback to the UE 10.

According to one or more embodiments of the first example of the present invention, the UE 10 can receive various types of CSI-RSs (periodic/aperiodic/semi-persistent CSI-RS) based on the newly designed CSI process for NR.

Resource Setting

According to one or more embodiments of the first example of the present invention, as shown in FIG. 3, for example, the resource setting includes an RS resource number, time-domain information, frequency-domain information, multiplexing position in a resource block (RB), information of the number of antenna ports, Code Division Multiplexing (CDM) (or Orthogonal Cover Code (OCC)) information, and Measurement Restriction (MR) information.

The RS resource number is a number (index) indicating resources corresponding to the RS.

The time-domain information may include information indicating at least one transmission type of periodic/aperiodic/semi-persistent transmission, at least one transmission period and at least one timing offset value, and the number of RS transmission for semi-persistent CSI-RS.

The information indicating the transmission type of periodic/aperiodic/semi-persistent transmission designates the type of the RS transmission. For example, when the BS 20 transmits the periodic RS, "periodic" is designated as the type in the information. Similarly, the BS 20 transmits the aperiodic RS, "aperiodic" is designated as the type in the information. The BS 20 transmits the semi-persistent RS, "persistent" is designated as the type in the information.

The transmission period and the timing offset value may be designated when the periodic and semi-persistent RS are transmitted. As another example, when the aperiodic RS is transmitted, a single resource may be designated based on the RS resource reserved periodically and triggered timing.

The number of RS transmission may be designated when the semi-persistent RS is transmitted.

The frequency-domain information may include information indicating at least one band type of wideband/partial band/subband, frequency hopping information, and frequency reuse information.

The information indicating a band type of wideband/partial band/subband indicates the band type used for the RS transmission.

The frequency hopping information may be indicated, which can be a random seed, for example.

In the frequency reuse according to one or more embodiments of the present invention, the RSs may be multiplexed on partial and periodical frequency positions only. For example, the RSs may be multiplexed on either odd or even RBs (or subcarrier) only. The frequency reuse information may be frequency reuse period (e.g., 1, 2, 3, or 4 RB (or subcarrier)) and a frequency offset value.

The multiplexing position in resource block includes a multiplexing position in time-domain and frequency-domain in the RB. The multiplexing position according to one or more embodiments of the present invention may be similar to a CSI-RS configuration in LTE-Advanced (LTE-A).

The information of the number of antenna ports includes the number of the antenna ports of the RSs. For example, in the information of the number of antenna ports, resources of the small number of the antenna ports may be aggregated. For example, in the information of the number of antenna ports, eight 2-Tx CSI-RS resources may be designated to reserve 16-Tx CSI-RS resources.

The CDM (OCC) information may be information of the CDM applied to the CSI-RS. For example, in the CDM information, “2,” “4,” and “8” may be designated as CDM sequence length. In addition, in the CDM information, the CDM sequence may be designated so as to switch the CDM sequence.

The measurement restriction (MR) information may be set especially when the periodic and semi-persistent RS are transmitted. The MR information may be included in the CSI reporting setting, a CSI measurement setting, or other information other than the resource setting.

Figure 5:
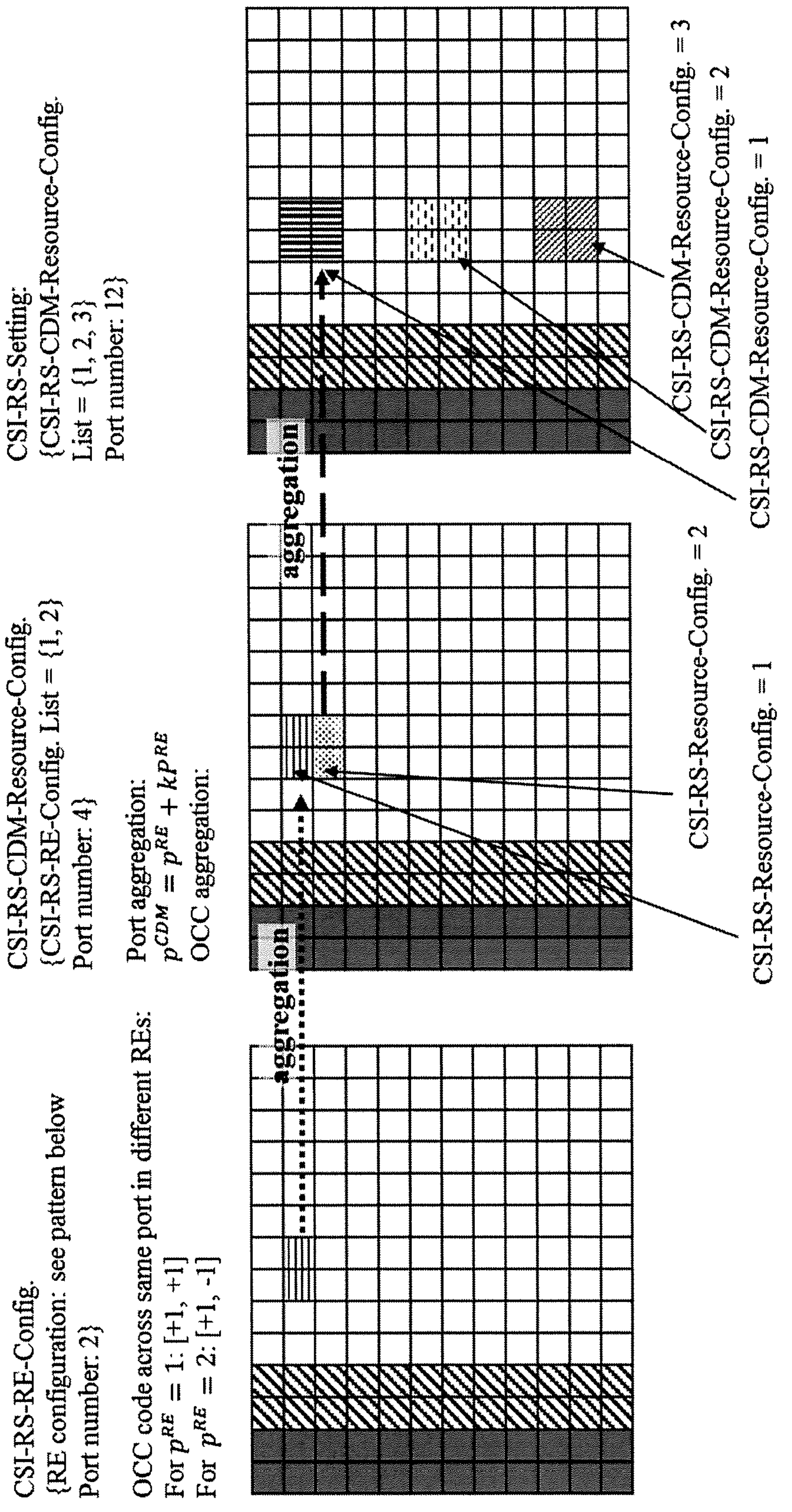
FIG. 5 is a diagram showing an example of the CSI-RS resource configurations according to one or more embodiments of the first example of the present invention.
Figure 6:
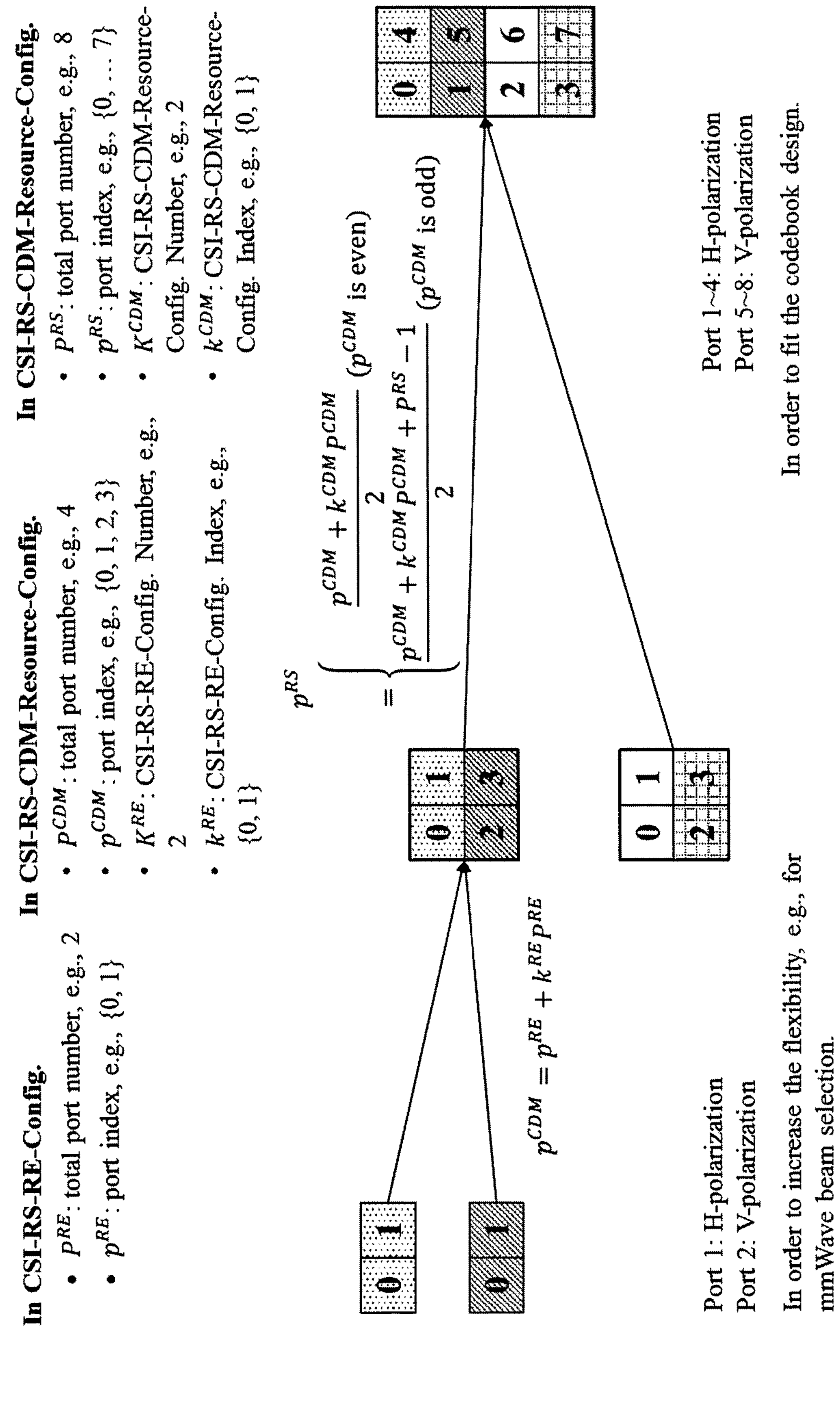
FIG. 6 is a diagram to explain port aggregation in FIG. 5 according to one or more embodiments of the first example of the present invention.

For example, a CSI-RS resource configuration may be configured as a format of FIG. 4. The CSI process may be associated with the CSI-RS resource configuration. In FIG. 4, IE (Information Element) indicates a parameter name of a Radio Resource Control (RRC) parameter. For example, in FIG. 4, the CSI-RS resources for multiple antennas may be reserved by combining a plurality of levels including predetermined parameters. FIG. 5 is a diagram showing an example of CSI-RS resource configurations according to one or more embodiments of the first example of the present invention. FIG. 6 is a diagram to explain port aggregation in FIG. 5 according to one or more embodiments of the first example of the present invention. FIG. 7 is a diagram to explain OCC code design in FIG. 5 according to one or more embodiments of the first example of the present invention.

CSI-RS sweeping can be utilized for beam selection (or CSI-RS resource selection). In addition to the above information elements as shown in FIG. 3, the resource setting may include CSI-RS sweeping information.

For example, the CSI-RS sweeping information may include information of a plurality of multiplexing positions in time-domain, frequency-domain, and the RB corresponding to one CSI-RS resource to perform the beam sweeping which includes multi-shot transmission using the common beam.

For example, the CSI-RS sweeping information may include information indicating that different beams are multiplexed as different CSI-RS antenna ports. For example, the CSI-RS sweeping information may include the number of antenna ports per beam (or the number of beam). That is, the number of antenna ports per beam (or the number of beam) may be configured.

For example, the CSI-RS sweeping information may include information indicating that different beams are multiplexed as different CSI-RS resources. For example, the CSI-RS sweeping information may include a plurality of CSI-RS resources for the beam sweeping. That is, plurality of CSI-RS resources for the beam sweeping may be configured.

For example, the CSI-RS sweeping information may include the number of beams (the number of CSI-RS resources) used for the beam sweeping. That is, the BS 20 may notify the UE 10 of the number of beams (the number of CSI-RS resources) used for the beam sweeping.

For example, the CSI-RS sweeping information may include precoding information for a plurality of CSI-RS used for the beam sweeping. For example, the precoding information may indicate whether the precoders applied to a plurality of CSI-RSs used for the beam sweeping are the same or different.

Furthermore, the resource setting may not include the CSI-RS sweeping information. For example the CSI-RS sweeping information is transmitted from the BS 20 to the UE 10 using signals different from the signal including the resource setting.

Furthermore, in addition to the above information elements as shown in FIG. 3, the resource setting may include time and/or frequency synchronization information used when the UE 10 receives the CSI-RS. For example, in case of Quasi Co-Location (QCL) between the CSI-RS and another physical signal/channel, the synchronization information may include another physical signal/channel (e.g., Mobility/Measurement Reference Signal (MRS)).

Furthermore, the resource setting may not include the synchronization information. For example, the synchronization information may be transmitted from the BS 20 to the UE 10 using signals different from the signal including the resource setting.

Furthermore, in addition to the above information elements as shown in FIG. 3, the resource setting may include information indicating a downlink RS other than the CSI-RS used for calculation of the CSI, RRM measurement, etc. For example, a RS type may be designated as the above information. For example, the RS type can be designated may be all or part of CSI-RS, MRS, Demodulation Reference Signal (DM-RS), and Sounding Reference Signal (SRS)).

Furthermore, the resource setting may not include the above information indicating the downlink RS. For example, the above information may be transmitted from the BS 20 to the UE 10 using signals different from the signal including the resource setting.

IM Setting

According to one or more embodiments of the first example of the present invention, as shown in FIG. 8, for example, the IM setting includes an Interference Measurement Resource (IMR) number, time-domain information, frequency-domain information, multiplexing position in a resource block (RB), and Measurement Restriction (MR) information.

The IMR number is a number (index) indicating resources corresponding to the IM.

The time-domain information includes information indicating at least one type of periodic/aperiodic/semi-persistent IM, an IM period and at least one timing offset value, and the multiplexing number of IMRs especially when IM is semi-persistently allocated.

In the information indicating the type of periodic/aperiodic/semi-persistent IM, “periodic,” “aperiodic,” or “semi-persistent” may be designated.

The IM period and the timing offset value may be designated when “periodic” or “semi-persistent” is designated. As another example, when the aperiodic IM is designated, a single resource may be designated based on the IMR reserved periodically and triggered timing.

The multiplexing number of IMRs may be designated when the semi-persistent IM is designated.

The frequency-domain information includes information indicating a band type of wideband/partial band/subband, frequency hopping information, and frequency reuse information.

The information indicating a band type of wideband/partial band/subband indicates the band type used for the IM.

The frequency hopping information may be included which may be a random seed, for example.

In the frequency reuse according to one or more embodiments of the present invention, the IMRs may be multiplexed on partial and periodical frequency positions only. For example, the IMRs may be multiplexed on either odd or even RBs (or subcarrier) only. The frequency reuse information may be frequency reuse period (e.g., 1, 2, 3, or 4 RB (or subcarrier)) and a frequency offset value.

The multiplexing position in resource block includes a multiplexing position in time-domain and frequency-domain in the RB. The multiplexing position according to one or more embodiments of the present invention may be similar to a IMR configuration in LTE-Advanced (LTE-A).

The MR information may be set when the periodic and semi-persistent IM are designated. The MR information may be included in the CSI reporting setting, a CSI measurement setting, or other information other than the IM setting.

According to one or more embodiments of the first example of the present invention, multiple interference measurements (IMs) may be used for estimation of multiple interference beams such as comparison of signal strength. For example, the BS 20 may notify the UE 10 of a plurality of IMRs. For example, in addition to the above information elements as shown in FIG. 8, the IM setting may include IMR information including a plurality of IMRs.

For example, the IMR information may include information of a plurality of multiplexing positions in time-domain, frequency-domain, and the RB corresponding to one IMR to perform the beam sweeping which includes multi-shot transmission using the common beam in each of a plurality of IMRs.

For example, the IMR information may include information indicating that different beams are multiplexed as different antenna ports in the IMR. For example, the IMR information may include the number of antenna ports per interference resource (or the number of interference sources). That is, the number of antenna ports per interference resource (or the number of interference sources) may be configured.

For example, the IMR information may include information indicating that different beams are multiplexed as different IMRs. For example, the IMR information may include a plurality of IMRs for the beam sweeping. That is, plurality of IMRs for the beam sweeping may be configured.

For example, the IMR information may include the number of beams (the number of IMRs) used for the beam sweeping. That is, the BS 20 may notify the UE 10 of the number of beams (the number of IMRs) used for the beam sweeping.

For example, the IMR information may include precoding information for multiple IMs used for the beam sweeping. For example, the precoding information may indicate whether the precoders applied to multiple IMs used for the beam sweeping are the same or different.

Furthermore, the IM setting may not include the IMR information. For example the IMR information is transmitted from the BS 20 to the UE 10 using signals different from the signal including the IM setting.

Furthermore, the IM setting may not include the above information indicating the downlink RS. For example, the IMR information may be transmitted from the BS 20 to the UE 10 using signals different from the signal including the resource setting.

As another example, a Non-Zero Power (NZP) RS such as the CSI-RS and DM-RS may be used for interference estimation. As another example, how to estimate interference may depend on implementation of the UE.

For example, in one or more embodiments of the present invention, the above estimation method based on the NZP RS, an estimation method based on a Zero Power (ZP) RS, the estimation method based on the implementation of the UE may be dynamically or semi-statically switched. Furthermore, a type of the NZP RS may be designated.

CSI Reporting Setting

According to one or more embodiments of the first example of the present invention, as shown in FIG. 9, for example, the CSI reporting setting includes a CSI reporting setting number, time-domain information, a multiplexing method of reporting information, feedback information, codebook information, switching information to switch between Type I and Type II CSI feedback, and ON/OFF information of CSI Reporting.

The CSI reporting setting number is a number (index) identifying the CSI reporting setting.

The time-domain information includes information indicating a CSI reporting type of periodic/aperiodic/semi-persistent CSI reporting, a CSI reporting period and a timing offset value, and the number of CSI reporting.

In the information indicating the CSI reporting type of periodic/aperiodic/semi-persistent CSI reporting, "periodic," "aperiodic," or "semi-persistent" may be designated.

The CSI reporting period and the timing offset value may be designated when "periodic" or "semi-persistent" is designated. As another example, when "aperiodic" is designated, a single resource may be designated based on the CSI reporting resource reserved periodically and triggered timing.

The number of CSI reporting may be designated when "semi-persistent" is designated.

The multiplexing method of reporting information includes multiplexed physical channel information. For example, At least one of Physical Uplink Control Channel (PUCCH) and/or Physical Uplink Shared Channel (PUSCH) may be designated in the multiplexed physical channel information.

In the feedback information, for example, at least one of the RI, CRI, PMI, CQI, and RSRP may be designated.

The codebook information includes information indicating the codebook applied in the UE 10 so that the applied codebook is configured. For example, the codebook information includes information indicating a plurality of applied codebooks in accordance with the number of antenna ports and the feedback information such as the RI, CRI, PMI, CQI, and RSRP so that a plurality of applied codebooks are configured.

In the switching information, "Type I CSI feedback" or "Type II CSI feedback" may be designated. NR supports CSI reporting with two types of spatial information feedback. Type I CSI feedback can be defined as "Normal" and codebook-based PMI feedback with normal spatial resolution. Type II feedback can be defined as "Enhanced" and explicit feedback and/or codebook-based feedback with higher spatial resolution. For Type I and II CSI feedback, the CSI feedback per subband as well as wideband feedback are supported. For Type I and II CSI feedback, beam-related feedback can be included.

The ON/OFF information of the CSI reporting includes information to designate ON/OFF of the CSI reporting. When the ON of the CSI reporting is designated, the UE 10 performs the CSI reporting. On the other hand, when the OFF of the CSI reporting is designated, the UE 10 does not perform the CSI reporting. As another example, a flag indicating "OFF of the CSI reporting" may be multiplexed (added) to the CSI reporting type of the periodic/aperiodic/semi-persistent CSI reporting CSI Measurement Setting According to one or more embodiments of the first example of the present invention, as shown in FIG. 10, for example, the CSI measurement setting includes a CSI measurement setting number, an resource setting (for CSI measurement), an IM setting (for CSI measurement), and a CSI reporting setting, and ON/OFF functionality.

The CSI measurement setting number is a number (index) identifying the CSI measurement setting.

The resource setting and the IM setting indicate information of the RS for the CSI measurement and the IM for the CSI measurement, respectively.

ON/OFF of the CSI measurement setting may be designated in the ON/OFF functionality.

Second Example

In the legacy LTE standard such as Rel. 13 LTE, the periodic CSI-RS only is defined as the CSI-RS transmission method. In NR, in addition to the periodic CSI-RS, the aperiodic CSI-RS and the semi-persistent CSI-RS are newly designed. That is, in NR, three types of the CSI-RS transmission, which are the periodic/aperiodic/semi-persistent CSI-RS transmission, are to be introduced. Furthermore, in NR, three types of the CSI reporting, which are the periodic/aperiodic/semi-persistent CSI reporting, are to be introduced.

If UE is configured with CSI reporting based on aperiodic CSI-RS (or semi-persistent CSI-RS), there is no guarantee that CSI-RS is received at UE, since these CSI-RS can be transmitted on/off.

In one or more embodiments of a second and third examples of the present invention, combinations of the resource setting (CSI-RS transmission type) and the CSI reporting setting (CSI reporting type) such as "the semi-persistent CSI-RS and the periodic CSI reporting" and "the aperiodic CSI-RS and the periodic or semi-persistent CSI reporting" may be restricted.

According to one or more embodiments of a second example of the present invention, even when the BS 20 transmits the periodic CSI-RS and designates the semi-persistent CSI reporting, the UE 10 can perform the CSI-reporting properly.

Figure 11:
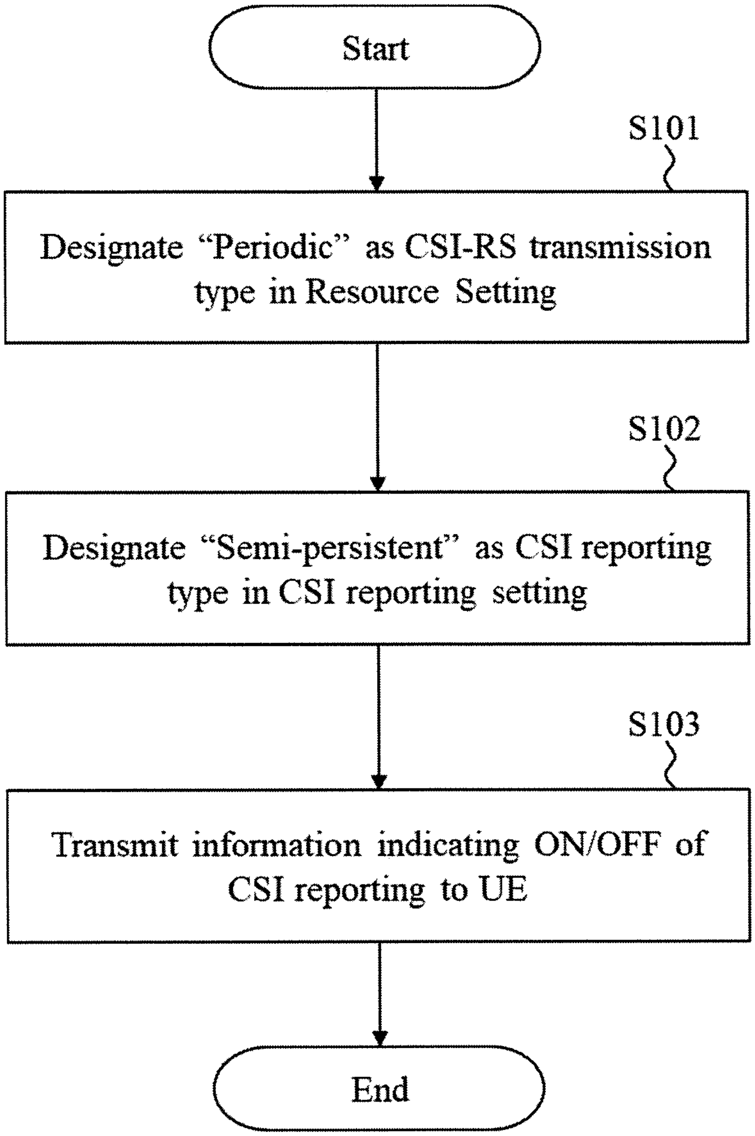
FIG. 11 is a flowchart showing an operation example in the BS according to one or more embodiments of a second example of the present invention.

FIG. 11 is a flowchart showing an operation of the BS 20 according to one or more embodiments of the second example of the present invention.

As shown in FIG. 11, at step S101, the BS 20 may designate "periodic" as the CSI-RS transmission type in the resource setting.

At step S102, the BS 20 may designate "semi-persistent" as the CSI reporting type in the CSI reporting setting.

At step S103, the BS 20 may transmit information indicating on/off of CSI reporting to the UE 10. For example, the information indicating on/off of CSI reporting may be transmitted using Media Access Control Control Element (MAC CE) and/or Downlink Control Information (DCI).

Then, the UE 10 may perform the semi-persistent CSI reporting based on the information indicating on/off of CSI reporting even when the UE 10 receives the periodic CSI-RS from the BS 20.

Furthermore, for example, when the BS 20 designates "periodic" as the CSI-RS transmission type in the resource setting and designates "periodic" or "aperiodic" as the CSI reporting type in the CSI reporting setting, the UE 10 may perform the CSI reporting in accordance with a scheme defined in the LTE standard.

Third Example

In the aperiodic and semi-persistent CSI-RSs transmission, an on/off transmission scheme can be performed. As a result, the UE may not necessarily receive the CSI-RS before the CSI reporting.

According to one or more embodiments of a third example of the present invention, when the BS 20 transmits the semi-persistent or aperiodic CSI-RS, the UE 10 may not assume that all or part of CSI reporting schemes are configured. For example, at least a non-allowable combination of the CSI-RS transmission type and the CSI reporting type in the CSI measurement setting may be designated in the CSI measurement setting so that the CSI reporting type in the non-allowable combination(s) is not configured in the UE 10.

Figure 12:
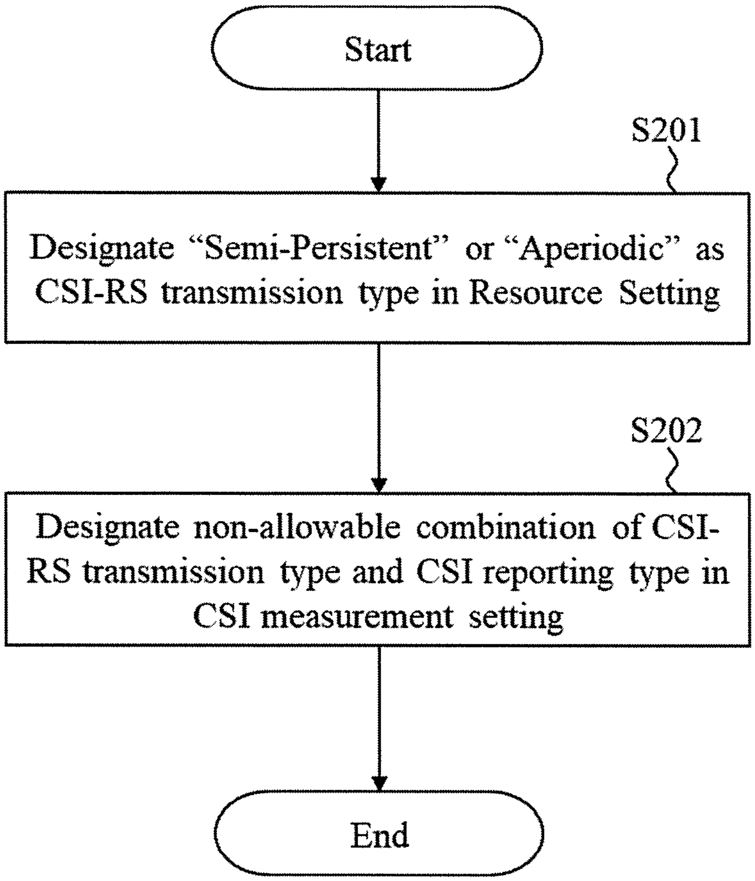
FIG. 12 is a flowchart showing an operation example in the BS according to one or more embodiments of a third example of the present invention.

FIG. 12 is a flowchart showing an operation of the BS 20 according to one or more embodiments of the third example of the present invention.

As shown in FIG. 12, at step S201, the BS 20 may designate "semi-persistent" or "aperiodic" as the CSI-RS transmission type in the resource setting.

At step S202, the BS 20 may designate at least a non-allowable combination of the CSI-RS transmission type and the CSI reporting type in the CSI measurement setting. For example, the non-allowable combination may be at least one of the combinations "semi-persistent CSI-RS and periodic CSI reporting," "aperiodic CSI-RS and periodic CSI reporting," and "aperiodic CSI-RS and semi-persistent CSI reporting."

Then, the BS 20 may transmit, to the UE 10, the CSI measurement setting including the non-allowable combination(s) as the CSI process for NR by following the procedure as shown in FIG. 2.

The UE 10 may receive the CSI measurement setting including the non-allowable combination(s). Then, the UE 10 may not assume the CSI reporting type in the non-allowable combination(s) is configured.

Third Modified Example

According to one or more embodiments of a third modified example of the present invention, when the BS 20 transmits the semi-persistent or aperiodic CSI-RS, the UE 10 may perform the CSI reporting (transmit the CSI feedback) based on the last received CSI RS resource.

According to one or more embodiments of a third modified example of the present invention, when the BS 20 transmits the semi-persistent or aperiodic CSI-RS, the UE 10 may not perform the CSI reporting if the CSI-RS which is a target of the CSI feedback does not exist. For example, if the UE 10 does not receive the CSI-RS during a predetermined period from when the CSI reporting is triggered or when the CSI reporting is performed, the UE 10 may not perform the CSI reporting.

According to one or more embodiments of a third modified example of the present invention, when the BS 20 transmits the semi-persistent or aperiodic CSI-RS, the UE 10 may not multiplex the CSI on feedback information.

According to one or more embodiments of a third modified example of the present invention, when the BS 20 transmits the semi-persistent CSI-RS, the UE 10 may activate or deactivate the CSI reporting in accordance with activation or deactivation of the semi-persistent CSI-RS. For example, common activation/deactivation signaling in the CSI-RS and the CSI reporting may be used.

Figure 13A:
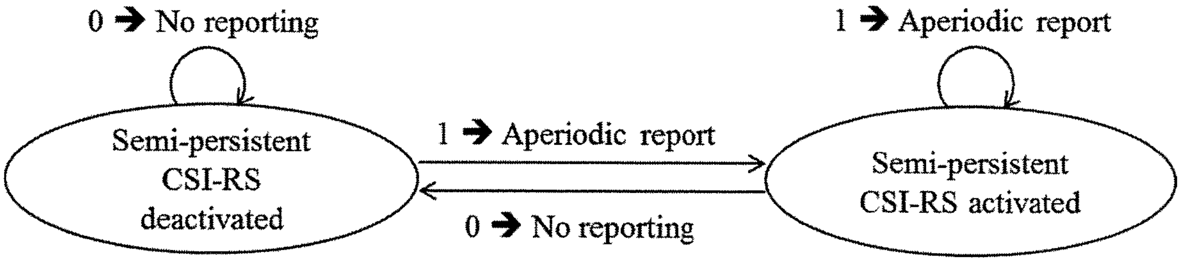
FIGS. 13A and 13B are diagrams showing state transition between activation/deactivation of the semi-persistent CSI-RS and the aperiodic CSI reporting according to one or more embodiments of a third modified example of the present invention.
Figure 13B:
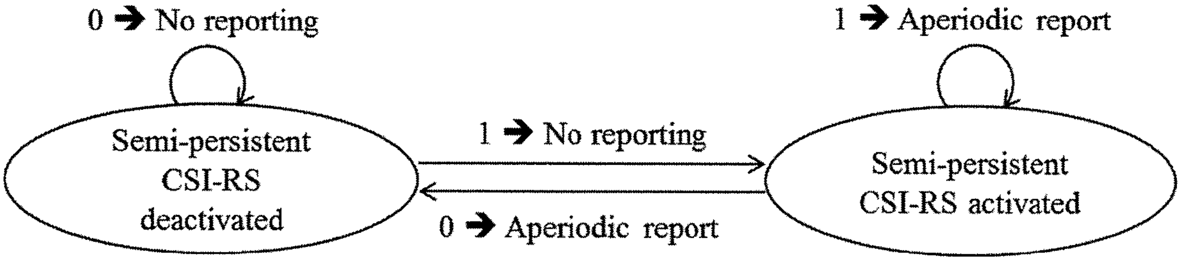
Figure 14A:
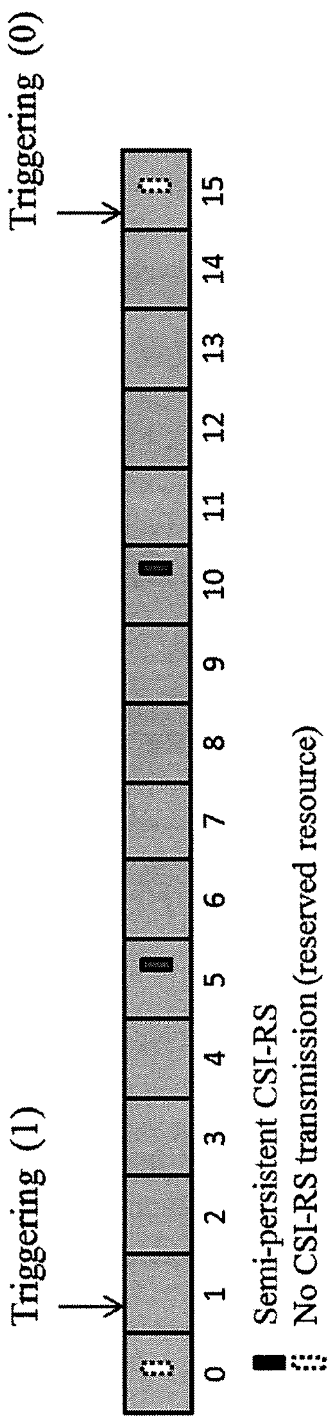
FIGS. 14A and 14B are diagrams showing activation of a semi-persistent CSI-RS based on a trigger bit according to one or more embodiments of the third modified example of the present invention.
Figure 14B:
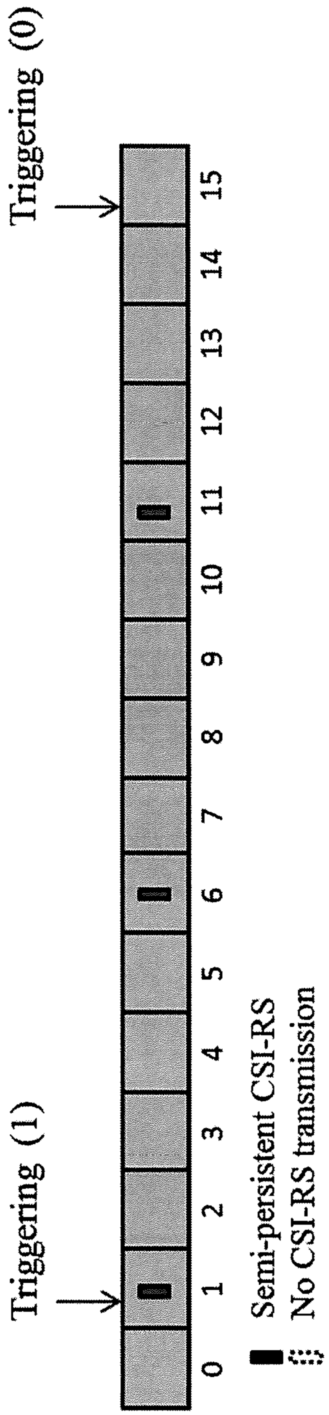

For example, activation/deactivation of the semi-persistent CSI-RS and the aperiodic CSI reporting may be performed using the common trigger information (trigger bit). For example, the trigger information may be indicated as the MAC CE, the DCI, or a combination of the MAC CE and the DCI. The trigger bit may be one-bit information. FIGS. 13A and 13B are diagrams showing state transition between activation/deactivation of the semi-persistent CSI-RS and on/off of the aperiodic CSI reporting. FIGS. 14A and 14B are diagrams showing activation of a semi-persistent CSI-RS based on the trigger bit according to one or more embodiments of the third modified example of the present invention.

In FIGS. 13A and 13B, "1" indicates that the UE 10 receives the trigger bit and "0" indicates that the UE 10 does not receive the trigger bit. In other words, "1" indicates that the UE 10 receives the positive bit and "0" indicates that the UE 10 receives the negative bit.

As shown in FIG. 13A, when the semi-persistent CSI-RS is deactivated, if the UE 10 receives the trigger bit ("1"), the UE 10 assumes that the semi-persistent CSI-RS is activated and performs the aperiodic CSI reporting.

As shown in FIG. 13B, when the semi-persistent CSI-RS is deactivated, if the UE 10 receives the trigger bit ("1"), the UE 10 assumes that the semi-persistent CSI-RS is activated and does not perform the aperiodic CSI reporting.

As shown in FIGS. 13A and 13B, when the semi-persistent CSI-RS is deactivated, if the UE 10 does not receive the trigger bit ("0"), the UE 10 assumes that the semi-persistent CSI-RS remains deactivated and the UE 10 does not perform the aperiodic CSI reporting.

As shown in FIGS. 13A and 13B, when the semi-persistent CSI-RS is activated, if the UE 10 receives the trigger bit ("1"), UE 10 assumes that the semi-persistent CSI-RS remains activated and the UE 10 performs the aperiodic CSI reporting.

As shown in FIG. 13A, when the semi-persistent CSI-RS is activated, if the UE 10 does not receive the trigger bit ("0"), the UE 10 assumes that the semi-persistent CSI-RS is deactivated and does not perform the aperiodic CSI reporting.

As shown in FIG. 13B, when the semi-persistent CSI-RS is activated, if the UE 10 does not receive the trigger bit ("0"), the UE 10 assumes that the semi-persistent CSI-RS is deactivated and performs the aperiodic CSI reporting (the last aperiodic CSI report may be performed).

Furthermore, in one or more embodiments of the third modified example of the present invention, the CSI-RS used for the aperiodic CSI reporting may trigger to deactivate the semi-persistent CSI-RS.

For example, the UE 10 may activate the semi-persistent CSI-RS resource after delay time "X1" from a subframe including the trigger bit ("1"). For example, "X1" may be set as "0". The value of "X1" can be configurable.

For example, the UE 10 may deactivate the semi-persistent CSI-RS resource after delay time "X2" from a subframe including the trigger bit ("0"). For example, "X2" may be set as "0". The value of "X2" can be configurable.

The UE 10 may determine the transmission timing of the semi-persistent CSI-RS based on the trigger bit. For example, the semi-persistent CSI-RS after delay time "Y" from a subframe including the trigger bit may be periodically multiplexed. The value of "Y" can be configurable.

According to one or more embodiments of a modified third example of the present invention, when the BS 20 transmits the semi-persistent CSI-RS, the CSI reporting may be triggered in accordance with triggered information of the aperiodic CSI-RS. That is, for example, the CSI reporting based on the semi-persistent CSI-RS and the CSI reporting based on the aperiodic CSI-RS may be triggered based on common information.

Fourth Example

When the BS 20 transmits the semi-persistent CSI-RS, configuration information of the semi-persistent CSI-RS and activation/deactivation information of the semi-persistent CSI-RS are required to be transmitted from the BS 20 to the UE 10. However, when the activation/deactivation information is sequentially transmitted after the configuration information is transmitted, control delay in the BS 20 may be increased. Furthermore, when the UE 10 does not have default settings configured by Radio Resource Control (RRC) signaling, the UE 10 is unaware of presence and absence of the semi-persistent CSI-RS.

According to one or more embodiments of a fourth example of the present invention, when the semi-persistent CSI-RS is configured in the UE 10 by higher layer signaling such as the RRC signaling, a default operation (procedure) of the UE 10 may be designated.

For example, when the semi-persistent CSI-RS is configured in the UE 10 by the higher layer signaling, the UE 10 may assume either the presence or the absence of the semi-persistent CSI-RS as the default operation.

As another example, when the semi-persistent CSI-RS is configured in the UE 10 by the higher layer signaling, the BS 20 may transmit information to designate the default operation of the UE 10 to the UE 10. For example, the information to designate the default operation of the UE 10 may be the configuration information of the semi-persistent CSI-RS including presence/absence information of the semi-persistent CSI-RS.

Fifth Example

When the UE 10 performs the semi-persistent CSI reporting, configuration information of the semi-persistent CSI reporting and activation/deactivation information of the semi-persistent CSI reporting are required to be transmitted from the BS 20 to the UE 10. However, when the activation/deactivation information is sequentially transmitted after the configuration information is transmitted, control delay in the BS 20 may be increased. Furthermore, when the UE 10 does not have default settings configured by the RRC signaling, the UE 10 cannot determine whether the UE 10 should perform the semi-persistent CSI-RS reporting.

According to one or more embodiments of a fifth example of the present invention, when the semi-persistent CSI reporting is configured in the UE 10 by the higher layer signaling, a default operation of the UE 10 may be designated.

For example, when the semi-persistent CSI reporting is configured in the UE 10 by the higher layer signaling, the UE 10 may perform the default operation so that the UE 10 performs (or does not perform) the semi-persistent CSI reporting.

As another example, when the semi-persistent CSI reporting is configured in the UE 10 by the higher layer signaling, the BS 20 may transmit information to designate the default operation of the UE 10 to the UE 10. For example, the information to designate the default operation of the UE 10 may be the configuration information of the semi-persistent CSI reporting including information to instruct the UE 10 to perform (or not to perform) the semi-persistent CSI reporting.

Configuration of Base Station

Figure 15:
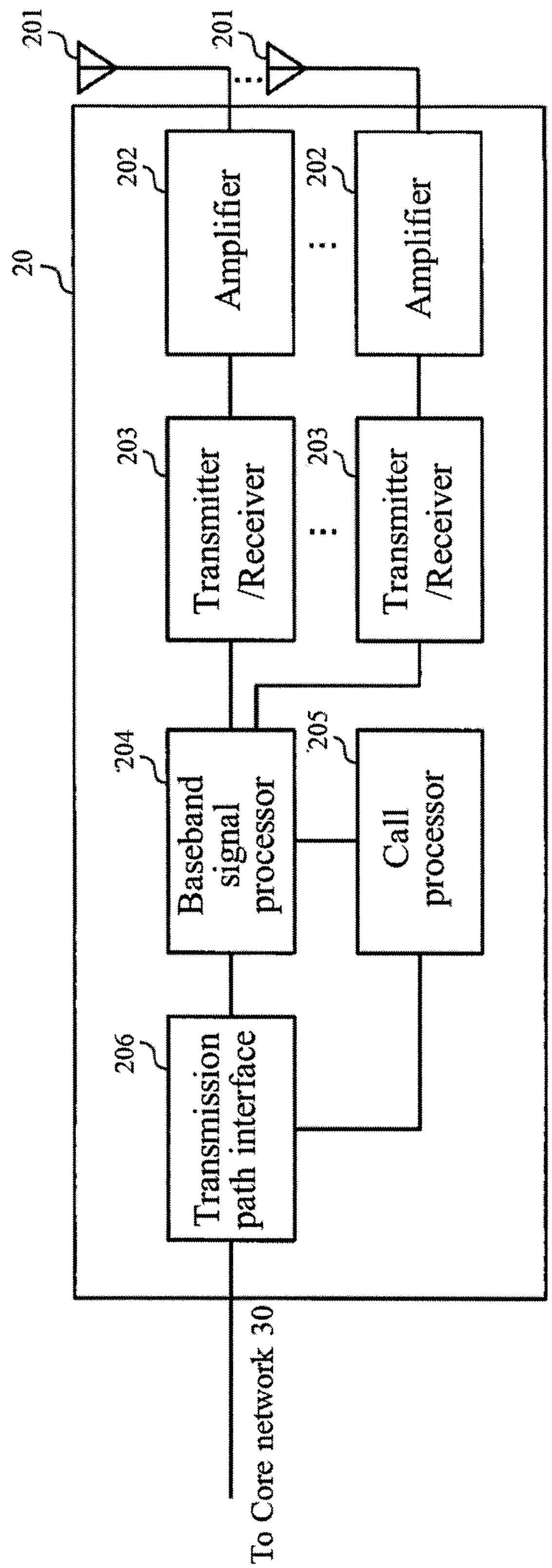
FIG. 15 is a diagram showing a schematic configuration of the BS according to one or more embodiments of the present invention.

The BS 20 according to one or more embodiments of the present invention will be described below with reference to FIG. 15. FIG. 15 is a diagram illustrating a schematic configuration of the BS 20 according to one or more embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

Configuration of User Equipment

Figure 16:
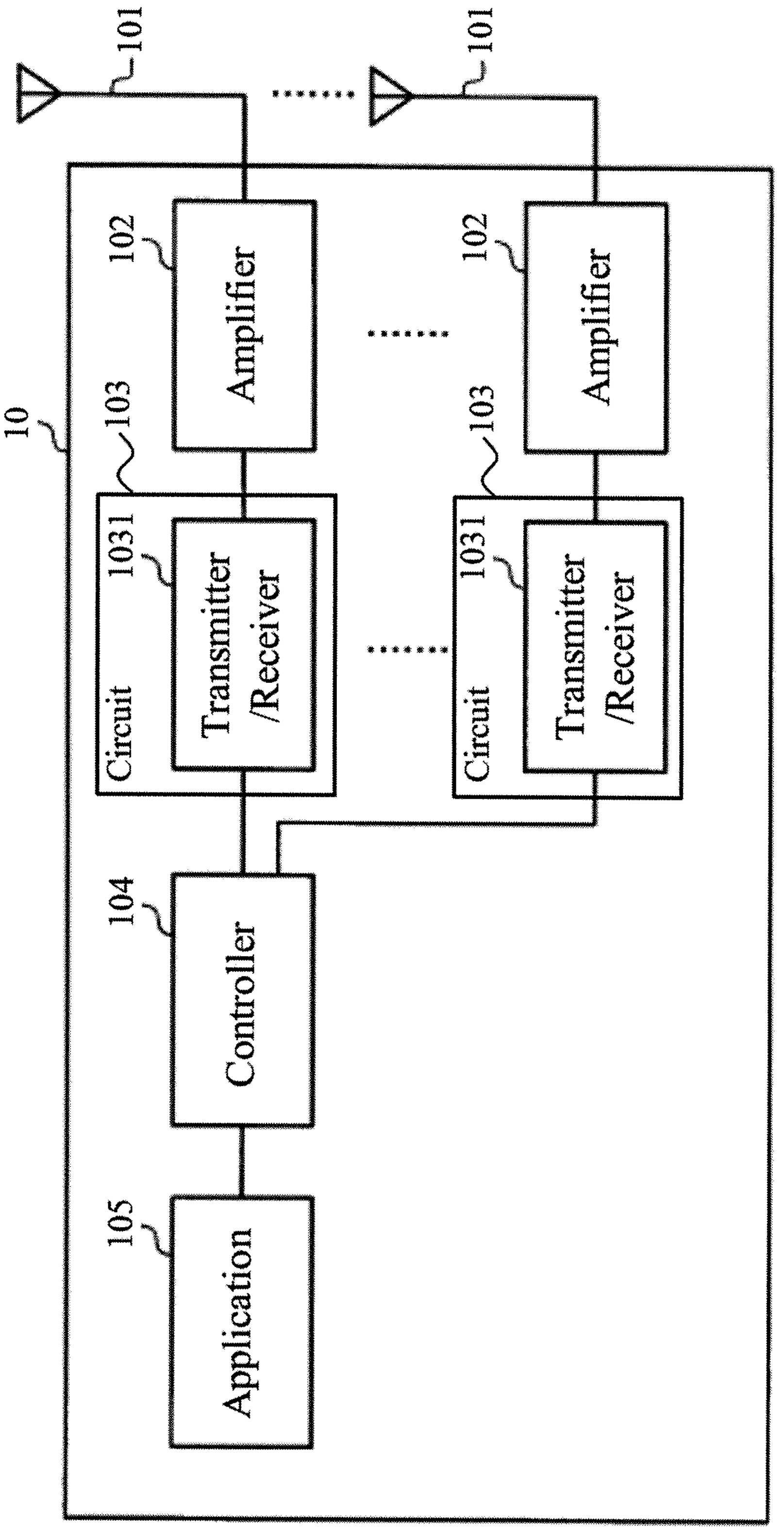
FIG. 16 is a diagram showing a schematic configuration of the UE according to one or more embodiments of the present invention.

The UE 10 according to one or more embodiments of the present invention will be described below with reference to FIG. 16. FIG. 16 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

Another Example

One or more embodiments of the present invention may be used for each of the uplink and the downlink independently. One or more embodiments of the present invention may be also used for both of the uplink and the downlink in common.

Although the present disclosure mainly described examples of a channel and signaling scheme based on LTE/LTE-A, the present invention is not limited thereto. One or more embodiments of the present invention may apply to another channel and signaling scheme having the same functions as LTE/LTE-A, NR, and a newly defined channel and signaling scheme.

Although the present disclosure mainly described examples of channel estimation and CSI feedback scheme based on the CSI-RS, the present invention is not limited thereto. One or more embodiments of the present invention may apply to another synchronization signal, reference signal, and physical channel such as synchronization signal (SS), measurement RS (MRS), mobility RS (MRS), and beam RS (BRS).

Although the present disclosure mainly described examples of various signaling methods, the signaling according to one or more embodiments of the present invention may be explicitly or implicitly performed.

Although the present disclosure mainly described examples of various signaling methods, the signaling according to one or more embodiments of the present invention may be the higher layer signaling such as the RRC signaling and/or the lower layer signaling such as the DCI and the MAC CE. Furthermore, the signaling according to one or more embodiments of the present invention may use a Master Information Block (MIB) and/or a System Information Block (SIB). For example, at least two of the RRC, the DCI, and the MAC CE may be used in combination as the signaling according to one or more embodiments of the present invention.

The UE antennas according to one or more embodiments of the present invention may apply to the UE including one dimensional antennas, planer antennas, and predetermined three dimensional antennas.

Although the present disclosure described examples of the CSI-RS, beamforming may be applied to the CSI-RS in the present disclosure.

In one or more embodiments of the present invention, the RB and a subcarrier in the present disclosure may be replaced with each other. A subframe, a symbol, and a slot may be replaced with each other.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A user equipment (UE) in communication with a base station (BS) in a wireless communication system, the UE comprising:

a receiver that receives, from the BS, a Channel State Information (CSI) report setting including time-domain behavior of CSI reporting that designates aperiodic, periodic, or semi-persistent; and a processor that performs the CSI reporting based on the aperiodic, periodic, or semi-persistent, wherein the CSI reporting setting includes a higher layer parameter codebook information that includes information indicating at least a codebook applied in the UE in accordance with a number of antenna ports, wherein when the aperiodic CSI-RS is designated, the periodic CSI reporting and the semi-persistent CSI reporting is not selected, wherein the receiver receives a resource setting of CSI-RSs transmission, wherein the resource setting of the CSI-RSs transmission includes:

Code Division Multiplexing (CDM) information;

information that indicates that precoders applied to the CSI-RSs in the CSI-RS transmission are different;

a multiplexing position on an odd resource block (RB) on which the CSI-RSs are multiplexed or a multiplexing position on an even RB in a resource block on which the CSI-RSs are multiplexed; and information that indicates multiple timing offset values being designated when the periodic and semi-persistent CSI-RS are transmitted, and wherein the higher layer parameter codebook information includes information indicating at least the codebook applied in the UE in accordance with the number of antenna ports and restriction information.

2. The UE according to claim 1, wherein when the aperiodic CSI-RS is designated, the semi-persistent CSI reporting is not selected.

3. The UE according to claim 1, wherein trigger information for the CSI reporting is indicated to the UE via downlink control information (DCI).

4. A method of acquiring Channel State Information (CSI) in a wireless communication system, the method comprising:

transmitting, from a Base Station (BS) to a User Equipment (UE), a CSI reporting setting including time-domain behavior of CSI reporting that designates aperiodic, periodic, or semi-persistent; and performing, with the UE, the CSI reporting based on the aperiodic, periodic, or semi-persistent, wherein the CSI reporting setting includes a higher layer parameter codebook information that includes information indicating at least a codebook applied in the UE in accordance with a number of antenna ports, wherein when the aperiodic CSI-RS is designated, the periodic CSI reporting and the semi-persistent CSI reporting is not selected, wherein the UE receives a resource setting of CSI-RSs transmission, wherein the resource setting of the CSI-RSs transmission includes:

Code Division Multiplexing (CDM) information;

information that indicates that precoders applied to the CSI-RSs in the CSI-RS transmission are different;

a multiplexing position on an odd resource block (RB) on which the CSI-RSs are multiplexed or a multiplexing position on an even RB in a resource block on which the CSI-RSs are multiplexed; and information that indicates multiple timing offset values being designated when the periodic and semi-persistent CSI-RS are transmitted, and wherein the higher layer parameter codebook information includes information indicating at least the codebook applied in the UE in accordance with the number of antenna ports and restriction information.

5. A Base Station (BS) in communication with user equipment (UE) in a wireless communication system, the BS comprising:

a processor that designates aperiodic, periodic, or semi-persistent as time-domain behavior in a Channel State Information (CSI) reporting setting; and a transmitter that transmits the CSI reporting setting to the UE such that the UE performs CSI reporting based on the aperiodic, periodic, or semi-persistent, wherein the CSI reporting setting includes a higher layer parameter codebook information that includes information indicating at least a codebook applied in the UE in accordance with a number of antenna ports, wherein the UE receives a resource setting of CSI-RSs transmission, wherein the resource setting of the CSI-RSs transmission includes:

Code Division Multiplexing (CDM) information;

information that indicates that precoders applied to the CSI-RSs in the CSI-RS transmission are different;

a multiplexing position on an odd resource block (RB) on which the CSI-RSs are multiplexed or a multiplexing position on an even RB in a resource block on which the CSI-RSs are multiplexed; and information that indicates multiple timing offset values being designated when the periodic and semi-persistent CSI-RS are transmitted, and wherein the higher layer parameter codebook information includes information indicating at least the codebook applied in the UE in accordance with the number of antenna ports and restriction information.

6. A wireless communication system comprising: a user equipment (UE) and a base station (BS), the UE comprising:

a receiver that receives, from the BS, a Channel State Information (CSI) report setting including time-domain behavior of CSI reporting that designates aperiodic, periodic, or semi-persistent; and a first processor that performs the CSI reporting based on the aperiodic, periodic, or semi-persistent, the BS comprising:

a second processor that designates aperiodic, periodic, or semi-persistent as time-domain behavior in the Channel State Information (CSI) reporting setting; and a transmitter that transmits the CSI reporting setting to the UE such that the UE performs CSI reporting based on the aperiodic, periodic, or semi-persistent, wherein the CSI reporting setting includes a higher layer parameter codebook information that includes information indicating at least a codebook applied in the UE in accordance with a number of antenna ports, wherein when the aperiodic CSI-RS is designated, the periodic CSI reporting and the semi-persistent CSI reporting is not selected, wherein the receiver receives a resource setting of CSI-RSs transmission, wherein the resource setting of the CSI-RSs transmission includes:

Code Division Multiplexing (CDM) information;

information that indicates that precoders applied to the CSI-RSs in the CSI-RS transmission are different;

a multiplexing position on an odd resource block (RB) on which the CSI-RSs are multiplexed or a multiplexing position on an even RB in a resource block on which the CSI-RSs are multiplexed; and information that indicates multiple timing offset values being designated when the periodic and semi-persistent CSI-RS are transmitted, and wherein the higher layer parameter codebook information includes information indicating at least the codebook applied in the UE in accordance with the number of antenna ports and restriction information.

* * * * *